INVENTORS
Raymond D. Atchley
Donald G. O'Brien

INVENTORS.
Raymond D. Atchley
Donald G. O'Brien
BY
ATTORNEY.

United States Patent Office 2,865,340
Patented Dec. 23, 1958

2,865,340
SERVO VALVE ASSEMBLY

Raymond D. Atchley, Los Angeles, Calif., and Donald G. O'Brien, Tulsa, Okla., assignors to Midwestern Instruments, Tulsa, Okla., a corporation Application August 17, 1955, Serial No. 529,049
13 Claims. (Cl. 121—41)

This invention relates to servosystems and particularly to an electro-hydraulic servo assembly combining electrical and hydraulic circuits in a fast-acting, closed-loop servo control capable of handling heavy loads through use of a relatively small signal-responsive device such as a torque-motor, the primary object being to provide a high-power, two-stage hydraulic valve having an internal self-nulling feature, a smaller size for given power-handling capabilities, self-clearing ability because of high second-stage force levels, lower hysteresis, increased frequency response and improved linearity between the input signal to the torque-motor and the output flow to conrtol ports forming a part of the valve body.

It is recognized that in this field solenoid valves have heretofore been provided for producing a hydraulic flow proportional to the input signal. In such single-stage units, electrical signals applied to a solenoid effect movement of the armature of the solenoid and, therefore, a valve stem operably coupled therewith.

Such relatively simple devices were subsequently improved as greater hydraulic power requirements called for increased capacity. Since the solenoid armatures were adversely effected by the forces of hydraulic pressure, the sizes of the torque-motors were increased and, therefore, the armature dimensions thereof could not be maintained at a minimum in order to maintain a high frequency response.

The prior art also teaches the two-stage principle to which the instant invention relates, and wherein a torque-motor is utilized to control an easily movable pilot spool which in turn controlled the flow of hydraulic fluid to a heavily movable second-stage spool. In such two-stage improvement, by virtue of a minimum armature size, the frequency response could be kept relatively high and the size of the whole device kept relatively small.

As initially set forth hereinabove, it is the most import object of the instant invention to still further improve the performance of hydraulic two-stage servo-valves through use of a relatively small torque-motor and minimum armature travel by an arrangement wherein the armature of the motor and the frame assembly thereof are rendered relatively movable with the armature operably connected to the pilot stage in the usual manner, but with the frame assembly operably coupled to the second-stage in a novel and advantageous manner.

Another important object of the instant invention is to provide a closed-loop servo control which utilizes the torque-motor as a summing device whereby position is determined through the function of the torque-motor in summing torque or force.

Another object of this invention is to provide a servo-system employing a novel signal-responsive device having a linear torsional spring that is easy to manufacture and which possess high lateral, low torsional stiffness for rendering the valve relatively insensitive to ambient accelerations.

A still further important object of the instant invention is to provide in a servosystem of the kind above set forth, an arrangement wherein the position of the armature of the torque-motor and, therefore, the pilot-stage operably coupled therewith, is determined, in one form of the invention, by the sum of the signal torque and the feedback torque, all through the provision of novel means for mounting the armature and the frame assembly of the torque-motor for relative movement through utilization, for example, of a torsional coupling of the armature to the frame assembly by the difference between a relatively stiff, positive mechanical spring and the negative magnetic spring produced when a signal is applied to the torque-motor.

A further important object of the instant invention is to provide a novel hydraulic circuit usable advantageously with the above-mentioned torque-motor and including a balanced arrangement wherein both the pilot-stage and the second-stage are equipped with a pair of spools or pistons operably coupled with the armature and with the frame assembly of the torque-motor respectively and shiftable alternately in opposite directions to control flow of hydraulic fluid to the second-stage spools or pistons and to the two control ports forming the body of the valve unit.

A still further important object of the instant invention is the provision in one embodiment of the servo-valve of a novel arrangement for attaining improved performance and virtually the same advantageous results as above set forth by translatory movement and predicted upon summation of forces whereby the position of the second stage control is determined by the force of the signal plus the translatory force of the feedback.

Many additional aims and objects will be made clear or become apparent as the following specification progresses, reference being had to the accompanying drawings, wherein.

Figures 1, 6:
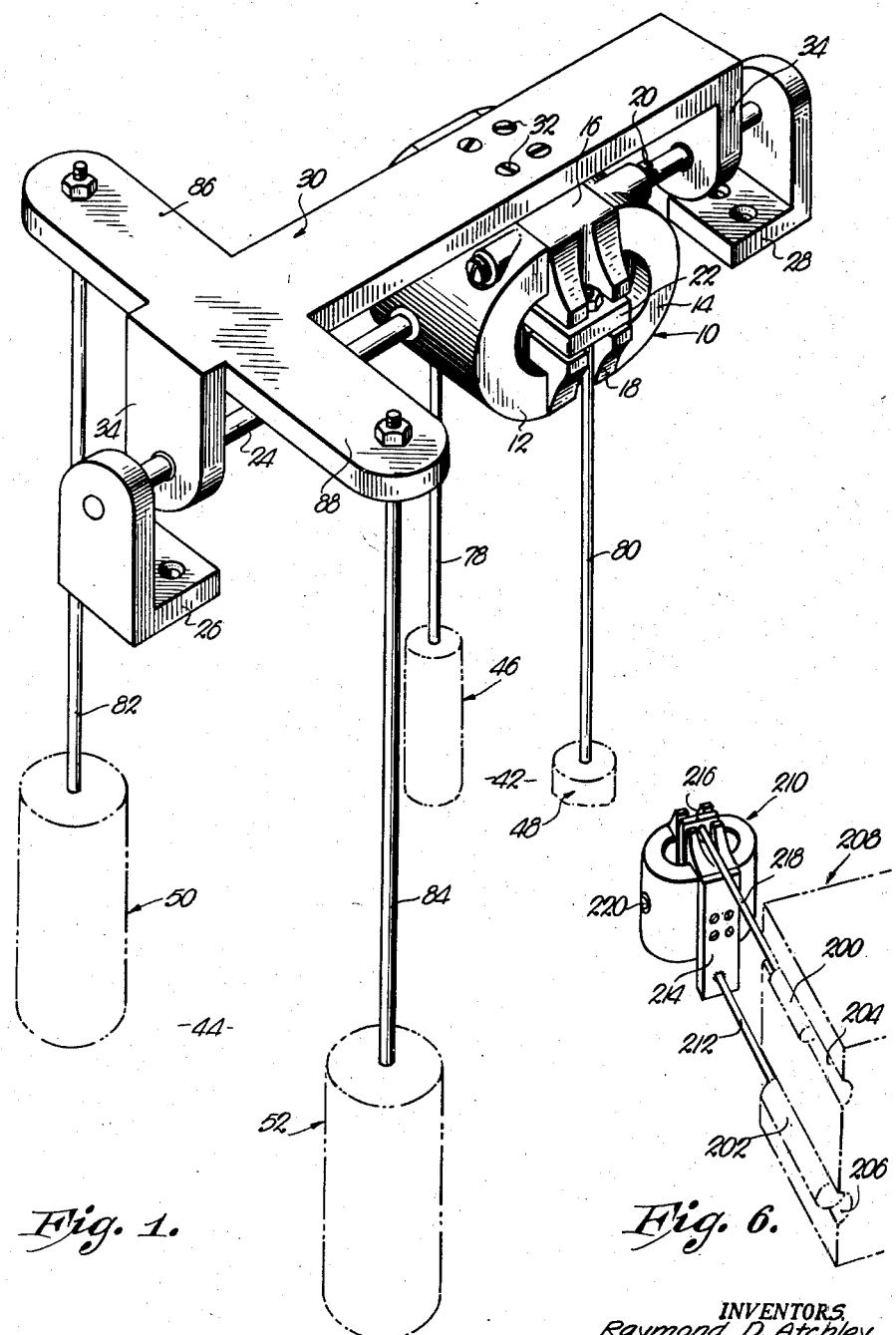
Figure 1 is a perspective view partially schematic illustrating the operable connection between the electrical and hydraulic circuits of one form of servovalve assembly made pursuant to the present invention.
Fig. 6 is a perspective view similar to Fig. 1 showing a modified form of the instant invention.
Figure 2:
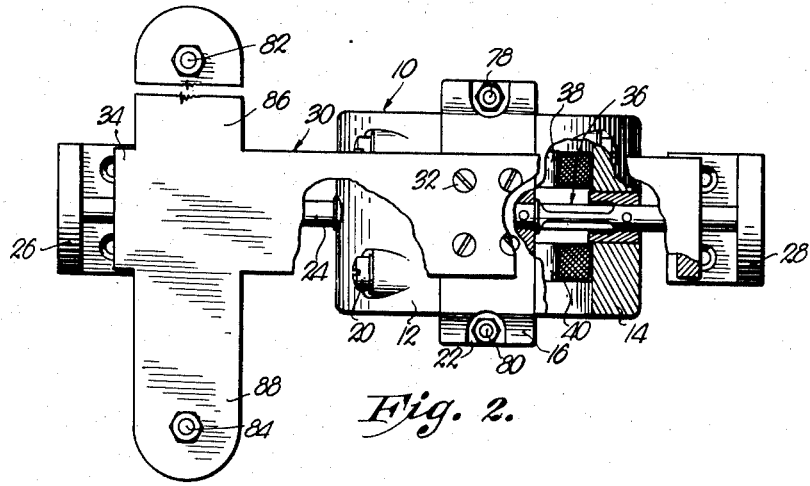
Fig. 2 is a plan view of the feedback arm and the torque-motor shown in Fig. 1, parts being broken away and in section to reveal details of construction.
Figure 3:
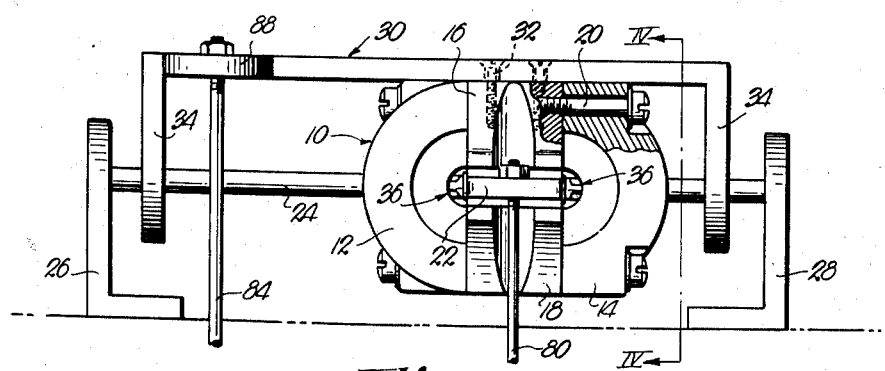
Fig. 3 is an elevational view thereof, parts being broken away for clearness.
Figure 4:
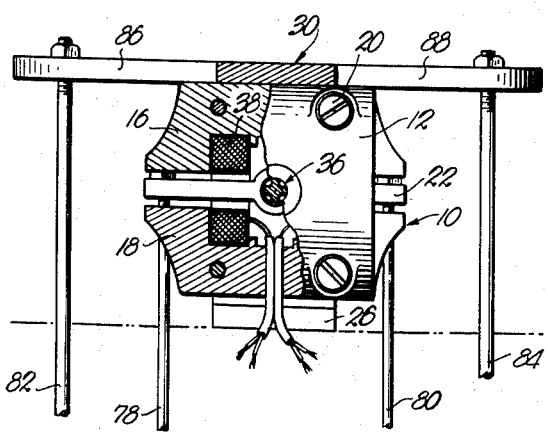
Fig. 4 is a cross-sectional view through the feedback arm and the armature shaft taken on line IV—IV of Fig. 3, parts being broken away for clearness.

As will hereinafter appear, the closed loop of the electro-hydraulic servovalve system illustrated in the drawings, contemplates the utilization of a torque-motor having a frame assembly, i. e. pole-pieces, magnets, and feedback lever, mounted on a shaft forming a part of the motor. The armature of the torque-motor is torsionally coupled to such frame assembly by the net spring, namely, the difference between a stiff, positive mechanical spring and a negative magnetic spring.

The signal, which in the torque-motor chosen for illustration comprises a differential current in a pair of torque-motor coils, drives the armature with respect to the torque-motor frame. The position of the armature and, therefore, the pilot-stage spools operably coupled therewith, is determined by the sum of such signal torque and the feedback torque or force (through the net spring).

Such position of the pilot spools in turn regulates the hydraulic flow which drives the second-stage spools, the latter of which are stiffly coupled to the feedback arm so that the position of the second-stage spools determines the position of the torque-motor frame. Therefore, as aforementioned, the torque-motor is utilized as a summing device since it sums torques or force to determine position. The position of the second-stage spools contained within the loop, determines the second-stage flow rate which, of course, constitutes the output of the system.

By virtue of the self-nulling feature contained internally within the valve, the frequency response is appreciably increased while maintaining a momentary minute displacement of the armature. The mechanical feedback contained within the unit, together with other advantageous principles, assures an output flow of oil that is substantially linearly proportional to the electrical input signal both in magnitude and direction.

The signal-responsive device forming a part of the electrical circuit of the servo system illustrated in Figs. 1–5 of the drawings, is in the nature of a torque-motor broadly designated by the numeral 10. It consists of a pair of opposed, permanent magnets 12 and 14 between which are clamped a pair of opposed pole-pieces 16 and 18 by means of suitable fasteners 20 shown in Figs. 2 to 4 inclusive. An armature plate 22 disposed between the faces of the pole-pieces 16 and 18 is rigidly attached to an armature shaft 24 that is in turn rotatable at the ends thereof in suitable brackets 26 mounted within the valve body (not shown). The shaft 24 traverses the magnets 12 and 14 and is fixed rigidly thereto.

A feedback arm 30 is secured rigidly to the polepiece 16 by use of fasteners 32 and is provided with downturned ears 34 which receive shaft 24.

While the frame assembly of the motor 10, as well as the feedback arm 30, may be mounted for movement relative to the armature 22 in any other suitable fashion, and while the armature 22 may be held biased to a null position in various ways, the utilization of shaft 24 is advantageous and in order to provide high lateral and low torsional stiffness in the shaft 24, the same is cut away at one or more points as at 36 to provide a cruciform cross-sectional configuration.

Armature 22 may be rendered sensitive to an applied signal in any suitable manner and, therefore, there is shown for illustrative purposes, a pair of electric coils 38 and 40 forming a part of the motor 10, it being understood that armature 22 is therefore, driven with respect to the frame assembly of the torque-motor 10 by a differential current in the two coils 38 and 40.

Figure 5:
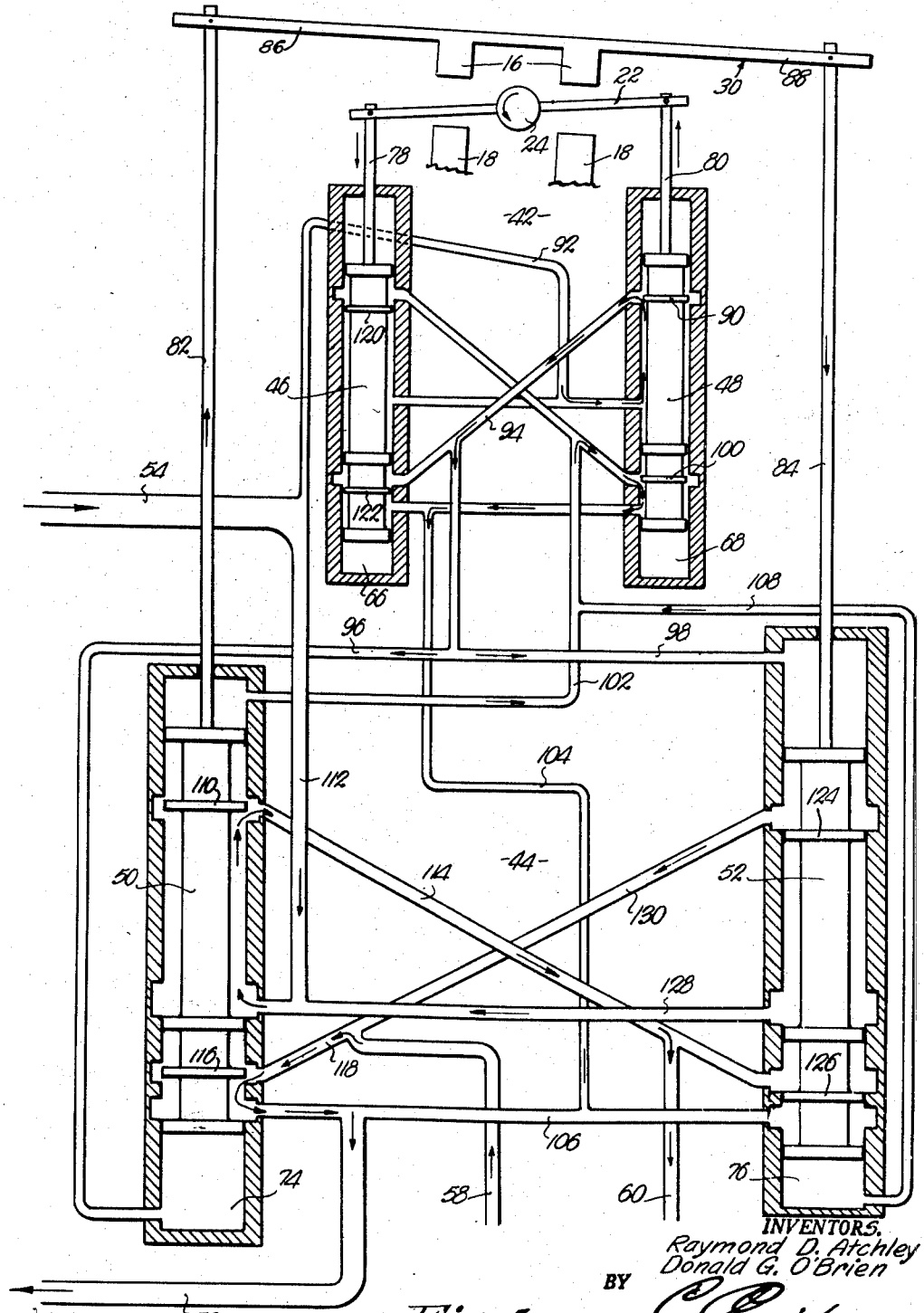
Fig. 5 is a schematic view of the hydraulic circuit showing schematically the operable connection between the hydraulic circuit and the torque-motor.

The hydraulic circuit, as best shown in Fig. 5 of the drawings, includes a pilot-stage control broadly designated by the numeral 42 and a second-stage control designated broadly by the numeral 44. Pilot-stage 42 includes twin pilot-stage spools 46 and 48, and second-stage control 44 is likewise provided with twin second-stage spools 50 and 52 that are driven hydraulically by the pilot stage 42, as will hereinafter appear. Line pressure is directed to the valve body by way of an inlet 54 and the hydraulic fluid is exhausted through an outlet 56. The output of the system to any external load with which it is desired that the system be used, is designated by a pair of control ports 58 and 60 formed in the valve body.

Spools 46 and 48 are reciprocable in corresponding cylinders or bores within the valve body and designated by the numerals 66 and 68. Similarly, the spools 50 and 52 are reciprocable within corresponding cylinders or bores 74 and 76. Stems 78 and 80 for the spools 46 and 48 respectively, are operably coupled with the armature 22 on opposite sides of the armature shaft 24 as seen in Figs. 1 to 5 inclusive of the drawings. Similarly, stems 82 and 84 for the spools 50 and 52 respectively, are operably coupled to lateral extensions 86 and 88 on the feedback arm 30 and at opposite sides of the armature shaft 24.

Flow of hydraulic fluid under pressure to the second-stage 44 takes place only when the armature 22 is shifted from a normal neutral or null position such as illustrated in Fig. 5 wherein movement of the armature 22 from such null position has caused the spool 46 to move in one direction and the spool 48 to shift in the opposite direction. The schematic diagram of the valve as shown in Fig. 5 represents a transient condition only since it is only in such condition that both stages will valve oil. The majority of the time, when the second stage 44 is controlling the flow of oil to and from the load via ports 58 and 60, which is the primary function of the valve, the pilot stage 42 will be shut off. The latter opens only momentarily during changing of the second stage 44. It is seen that land 90 of spool 48 has moved to a position venting the fluid from the inlet 54, through line 92, into the bore 68, thence through line 94 to a pair of branches 96 and 98, the former of which leads to one end of the bore 74 while branch 98 communicates with the opposite end of the bore 76.

By the same token, land 100 of the spool 48 has moved to a position permitting the flow of fluid displaced from the bores 74 and 76 to exhaust 56. From bore 74, the exhaust fluid passes through line 102, into the bore 68, and thence through lines 104 and 106 to the exhaust 56. Similarly, fluid is exhausted from bore 76 by way of lines 108 and 102, bore 68 and lines 104 and 106 to exhaust 56.

Consequently, and by virtue of such control of the spools 46 and 48 over the second-stage 44, the spool 50 is caused to move in one direction and the spool 52 caused to shift in the opposite direction to in turn impart a swinging movement to feedback arm 30 and the frame assembly of torque-motor 10 relative to the shaft 24. With the signal being applied to the torque-motor 10, holding the armature 22 displaced from null as shown in Fig. 5 and against the torsional spring action of shaft 24, such relative movements of the stems 82 and 84 in opposite directions, with a consequent shifting of the pole-pieces 16 and 18 on the axis of shaft 24, spools 46 and 48 will in turn be shifted to close the lands 90 and 100, thereby blocking the flow of line pressure to the second-stage spools 50 and 52 and also blocking the flow of fluid from the spools 50 and 52 to exhaust 56.

It is thus seen that the signal (differential current in the coils 38—40) drives the armature 22 with respect to the frame of torque-motor 10. The position of the armature 22 and the pilot spools 46—48 coupled to it, is determined by the sum of the signal torque (from the differential current in coils 38—40) and the feedback torque (through the net spring). This position of the pilot spools 46—48 in turn regulates the hydraulic flow which drives the second-stage spools 50—52. Since the latter are stiffly coupled to the feedback arm 30, their position determines the position of the frame of motor 10. Thus, motor 10 is utilized as a summing device (sums torque to determine position).

Movement of the spool 50 as above-described, opens land 110 thereof to vent line pressure from inlet 54 through line 112, bore 74 and line 114 to control port 60. Similarly, land 116 of spool 50 opens for flow of fluid from control port 58 to line 118, bore 74 and line 106 to exhaust 56.

Manifestly, when the armature 22 shifts in the opposite direction away from null, lands 120 and 122 open to permit flow of line pressure from inlet 54 to the spool 50 by way of line 102 and to the spool 52 by way of line 108. Conversely, fluid flows from the spool 50 to the exhaust 56 by way of branch 96 and from the spool 52 by way of branch 98. In the same manner, when the spools 50 and 52 are thus caused to shift in opposite directions, lands 124 and 126 of spool 52, function to effect flow of fluid from inlet 54 to the control 58 by way of lines 128 and 130 and from the control 60 to the exhaust 56 by way of lines 114 and 106.

It is now seen that in order to shift the armature 22 in either direction away from null, in which position it is normally yieldable biased by the torsional spring action of the shaft 24, it is necessary that the signal or differential current in the torque-motor coils 38 and 40 be of sufficient magnitude to overcome such spring bias of shaft 24. Such net spring comprises therefore, the difference between the stiff positive mechanical spring in shaft 24 and the negative magnetic spring.

After such signal effects movement of the armature 22 against the restraining action of shaft 24 to actuate the pilot-stage 42 and therefore, the second-stage 44, the position of the armature 22 is determined by two additive forces, namely, the sum of the signal torque and the feedback torque. As the second-stage 44 shifts the feedback arm 30 and accordingly, the frame assembly of the torque-motor 10, the extent of movement of the armature 22 to re-position the pilot-stage spools 46 and 48, will depend in part upon the differential current in the torque-motor coils 38 and 40 existing at the time of such feedback through the arm or lever 30.

It can now also be appreciated that, by virtue of the fact that armature 22 is operably coupled with an easily actuated pilot-stage 42 for controlling the second-stage 44, the heavily-moving spools 50 and 52 can be controlled with an extremely small torque-motor 10 and with but slight movement in armature 22 thereof. This provides an extremely high frequency response and assures maximum linearity between the input signal applied to the signal-responsive device 10 and the output flow to control ports 58 and 60.

The self-nulling features and internal feedback contained within the servovalve is effected by the relative movement between the armature 22 and the frame assembly of the torque-motor 10, together with the operable coupling between the second-stage control 44 and such frame assembly through feedback arm 30, all of which is a wide departure from both the single-stage solenoid valves initially described herein, and the two-stage valves of the prior art wherein the solenoid motors are anchored directly to the valve body.

Details of construction of such valve body and the way in which the various bores 66, 68, 74 and 76, as well as the hydraulic flow lines, are built therein, form no part of the instant invention and need not be further illustrated nor described. Similarly, it is contemplated that such valve body or housing be constructed in a manner to also contain the torque-motor 10 and its associated parts, all for the advantageous purpose of providing a relatively small, lightweight, electro-hydraulic servosystem having a wide variety of extended uses not heretofore made possible through use of conventional servo arrangements.

The principles of the instant invention are also exemplified in Fig. 6, showing schematically a pilot-stage spool 200 and a second-stage spool 202, reciprocable in bores 204 and 206 respectively of valve body 208. Torque-motor 210 is essentially the same as motor 10 above-described and has the frame thereof connected directly to stem 212 of spool 202 through feedback arm 214, while armature 216 thereof has a direct connection to stem 218 of spool 200.

A suitable linear torsional spring connection, such as above set forth, is provided between armature 216 and the motor frame through mounting shaft 220. Shaft 220 is not supported for rotation by body 208 however, as in the embodiment of Figs. 1–5; instead, armature 216 is supported by stem 218 of spool 200 and the frame of motor 210 is supported by the stem 212 of spool 202.

The various ports and fluid passages in body 208, as well as the lands on spools 200 and 202, have been omitted in Fig. 6 and may be the same as or similar to the arrangement shown in Fig. 5.

It is to be noted that the initial signal applied to torque-motor 210 imparts movement to armature 216 with respect to the frame of motor 210 and against the spring torque of shaft 220, thereby controlling pilot-stage spool 200 as above explained. Spool 202, moving in response to the control by spool 200, shifts the frame of motor 210, to in turn shift armature 216 therewith to a new position while the signal is applied to motor 210.

The modification of Fig. 6 is, therefore, operable essentially upon a force summation principle. While the armature and frame of motor 210 move relatively about an arc, the movement is substantially translatory since the movement arm is relatively long and the angle traversed is relatively small.

Having thus described the invention what is claimed as new and desired to be secured by Letters Patent is:

1. A servosystem comprising in combination, a pilot-stage control; a second-stage fluid flow control operably coupled with said pilot-stage control for response to the latter; an electro-mechanical, signal-responsive error-detecting actuator having an output displacement proportional in magnitude and direction to input differential current, said actuator including a pair of relatively shiftable elements, one of said elements being operably coupled with said pilot-stage control; and a direct, mechanical feedback connection between said second-stage control and the other of said elements.

2. A servosystem comprising in combination, a pilot-stage control provided with a displaceable member; a second-stage fluid flow control operably coupled with said pilot-stage control for response to the latter; an electro-mechanical, signal-responsive error-detecting actuator having an output displacement proportional in magnitude and direction to input differential current, said actuator including a pair of elements interconnected for relative rotation, one of the elements being operably coupled with said member for displacing the latter; and restoration means for said member including a direct, mechanical feedback connection between said second-stage control and the other of said elements.

3. A servosystem comprising in combination, a pilot-stage control provided with a reciprocable member; a second-stage fluid flow control operably coupled with said pilot-stage control for response to the latter; an electro-mechanical, signal-responsive error-detecting actuator having an output displacement proportional in magnitude and direction to input differential current, said actuator including a pair of relatively shiftable elements, one of said elements being operably coupled with said member for reciprocating the latter; and restoration means for said member including a direct, mechanical feedback connection between said second-stage control and the other of said elements.

4. A servosystem comprising in combination, a pilot-stage control provided with a displaceable member; a second stage fluid flow control operably coupled with said pilot-stage control for response to the latter; an electro-mechanical, signal-responsive error-detecting actuator having an output displacement proportional in magnitude and direction to input differential current, said actuator including a pair of relatively shiftable elements, one of said elements being provided with yieldable means biasing the same toward a predetermined null position, and being operably coupled with said member for displacing the latter upon displacement of the one element from said null position against the action of said yieldable means; and restoration means for said member including a direct, mechanical feedback connection between said second-stage control and the other of said elements.

5. A servosystem comprising in combination, a pilot-stage control; a second-stage fluid flow control operably coupled with said pilot-stage control for response to the latter; an error-detecting torque motor actuator for said pilot stage control having a movable frame assembly and an armature shiftable relative to the frame assembly, said armature being operably coupled with said pilot-stage control; and a direct, mechanical feedback connection between said second-stage control and said frame assembly for moving the latter relative to the armature.

6. A high-frequency-response servosystem comprising in combination, a pilot-stage control; a second-stage fluid flow control responsive to fluid pressures, said pilot-stage control being provided with valving means for controlling flow of fluid to said second stage control; an error-detecting torque motor actuator for said pilot stage control having a movable frame assembly and an armature shiftable relative to the frame assembly, said armature being operably coupled with said valving means; and a direct, mechanical feedback connection between said second-stage control and said frame assembly for moving the latter relative to the armature.

7. A high-frequency-response, hydraulic, two-stage servovalve comprising in combination, a pilot-stage control; a second-stage fluid flow control having shiftable means for controlling the flow of hydraulic fluid to a load, said shiftable means being responsive to hydraulic fluid pressure, said pilot-stage control being provided with shiftable means for controlling flow of fluid to the shiftable means of said second-stage control; an error-detecting torque-motor actuator for said pilot stage control having a movable frame assembly and an armature shiftable relative to the frame assembly, said armature being operably coupled with said shiftable means of the pilot-stage control; and a direct, mechanical built-in feedback operably connecting the shiftable means of the second-stage control with said frame assembly for moving the latter relative to the armature.

8. A high-frequency-response, hydraulic, two-stage servovalve comprising in combination, a valve body provided with an inlet for line pressure and a pair of control ports; a pilot-stage control and a second-stage fluid flow control carried by the body and each provided with a shiftable element, the shiftable element of the second-stage control being disposed to control the flow of hydraulic fluid to and from said ports, the shiftable element of the pilot-stage control being disposed to control the flow of hydraulic fluid to and from the shiftable element of the second-stage control; an error-detecting signal-responsive actuator for said pilot stage control having a movable frame assembly and an armature movable in one direction with respect to the frame assembly in response to a predetermined signal applied to said device, said armature being operably coupled with said shiftable element of the pilot-stage control; and a direct, mechanical feedback connection between the shiftable element of the second-stage control and the frame assembly for shifting the latter to move the armature in the opposite direction while said signal is being applied to the device.

9. A high-frequency-response, hydraulic, two-stage servovalve comprising in combination, a valve body provided with an inlet for line pressure and a pair of control ports; a pilot-stage control and a second-stage control carried by the body and each provided with a shiftable element, the shiftable element of the second-stage control being disposed to control the flow of hydraulic fluid to and from said ports, the shiftable element of the pilot stage control being disposed to control the flow of hydraulic fluid to and from the shiftable element of the second-stage control; a torque-motor having a rotatable shaft, a frame assembly and an armature, said armature being secured to the shaft and movable relative to frame assembly in response to a predetermined signal applied to the torque-motor, said frame assembly being secured to the shaft for rotation therewith; means connecting the armature to the shiftable element of the pilot-stage control for shifting the latter as the armature is moved; and a feedback connection between the shiftable element of the second-stage control and the frame assembly for rotating the latter as the pilot-stage control operates to direct fluid to the shiftable element of the second-stage control.

10. A high-frequency-response, hydraulic, two-stage servovalve comprising in combination, a valve body provided with an inlet for line pressure and a pair of control ports; a pilot-stage control and a second-stage control carried by the body and each provided with a shiftable spool, the spool of the second-stage control being disposed to control the flow of hydraulic fluid to and from said ports, the spool of the pilot-stage control being disposed to control the flow of hydraulic fluid to and from the spool of the second-stage control; a torque-motor having an armature, a frame assembly, and yieldable means interconnecting the frame assembly and the armature for relative rotation, said yieldable means holding the armature biased toward a null position, said armature being movable against the action of said yieldable means in response to a predetermined signal applied to said torque-motor; means connecting the armature to the spool of the pilot-stage control for shifting the latter as the armature is moved; and a feedback connection between the spool of the second-stage control and the frame assembly for rotating the latter as the pilot-stage control operates to direct fluid to the spool of the second-stage control.

11. A high-frequency-response, hydraulic, two-stage servovalve comprising in combination, a valve body provided with an inlet for line pressure and a pair of control ports; a shiftable pilot-stage spool and a shiftable second-stage spool carried by the body, the second-stage spool being disposed to control the flow of hydraulic fluid to and from said ports, the pilot-stage spool being disposed to control the flow of hydraulic fluid to and from the second-stage spool; an error-detecting torque motor actuator for said pilot stage spool having a rotatable shaft adapted to undergo torsion, an armature rigidly mounted on the shaft and movable in response to a predetermined signal applied to the torque motor, and a frame assembly fixed to the shaft; means connecting the armature to the pilot-stage spool for shifting the latter as the armature is moved; and a direct, mechanical feedback connection between the second-stage spool and the frame assembly for moving the latter and the shaft as the pilot-stage spool operates to direct fluid to the second-stage spool.

12. A servovalve comprising a valve body provided with an inlet for line pressure and a pair of control ports; a pair of pilot-stage spools and a pair of second-stage spools carried by the body, the second-stage spools being disposed to control the flow of hydraulic fluid to and from said ports, the pilot-stage spools being disposed to control the flow of hydraulic fluid to and from the second-stage spools; a torque-motor having a movable armature and a frame assembly movable relative to the armature; means connecting the armature with the pilot-stage spools for shifting the same in opposite directions as the armature is moved; and means connecting the frame assembly with the second-stage spools for moving the frame assembly as the second-stage spools shift in opposite directions.

13. A servosystem comprising a pilot-stage control having a reciprocable spool; a second-stage fluid flow control having a reciprocable spool responsive to reciprocation of the pilot-stage spool; an error-detecting signal responsive actuator for said pilot stage control having an armature and a frame movable relative to the armature; means mechanically securing the armature directly to the pilot-stage spool for support of the latter by the armature; and means securing said frame directly to the second-stage spool for support of the latter by the frame.

References Cited in the file of this patent

UNITED STATES PATENTS

| | | |
|---|---|---|
| 813,209 | Holmes | Feb. 20, 1906 |
| 1,638,102 | Roucka | Aug. 9, 1927 |
| 2,175,799 | Hodgman | Oct. 10, 1939 |
| 2,451,263 | Webb | Oct. 12, 1948 |
| 2,674,232 | Mason | Apr. 6, 1954 |
| 2,709,421 | Avery | May 31, 1955 |

FOREIGN PATENTS

| | | |
|---|---|---|
| 551,159 | Great Britain | Feb. 20, 1943 |